(12) United States Patent
Hirota (10) Patent No.: US 7,847,741 B2
(45) Date of Patent: Dec. 7, 2010

(54) INFORMATION PROCESSING APPARATUS AND OPERATION CONTROL METHOD

(75) Inventor: Toshiyuki Hirota, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 937 days.

(21) Appl. No.: 11/717,931

(22) Filed: Mar. 14, 2007

(65) Prior Publication Data

US 2007/0252827 A1 Nov. 1, 2007

(30) Foreign Application Priority Data

Apr. 26, 2006 (JP) ............................. 2006-122416

(51) Int. Cl.
*H01Q 1/24* (2006.01)
(52) U.S. Cl. .................... 343/702; 455/575.7
(58) Field of Classification Search ................. 343/702; 455/575.1, 575.7, 557
See application file for complete search history.

(56) References Cited

U.S. PATENT DOCUMENTS 6,425,723 B1 * 7/2002 Okada et al. ................. 414/277
2005/0128690 A1 * 6/2005 Chuang et al. ............... 361/681
2007/0037619 A1 * 2/2007 Matsunaga et al. ........ 455/575.7
2007/0146210 A1 * 6/2007 Hilgers ........................ 343/702
2007/0176835 A1 * 8/2007 Qi et al. ....................... 343/702

FOREIGN PATENT DOCUMENTS

| JP | 09-326719 | 12/1997 |
|----|-----------|---------|
| JP | 11-191751 | 7/1999 |
| JP | 2001-242845 | 9/2001 |

* cited by examiner

*Primary Examiner*—HoangAnh T Le
(74) *Attorney, Agent, or Firm*—Blakely, Sokoloff, Taylor & Zafman LLP (57) ABSTRACT

According to one embodiment, an information processing apparatus includes a display unit. A display portion is provided in the display unit. Antennas are provided in the display unit. The antennas include a first antenna which serves as a transmitting antenna and a second antenna which serves as a receiving antenna. An antenna switching unit makes, when the display unit is used in a state where the first antenna is located in a side of the display unit which side is closest to a user, the first antenna serve as the receiving antenna, and the second antenna serve as the transmitting antenna.

16 Claims, 8 Drawing Sheets

INFORMATION PROCESSING APPARATUS AND OPERATION CONTROL METHOD

CROSS-REFERENCE TO RELATED APPLICATIONS

This application is based upon and claims the benefit of priority from Japanese Patent Application No. 2006-122416, filed Apr. 26, 2006, the entire contents of which are incorporated herein by reference.

BACKGROUND

1. Field

One embodiment of the invention relates to an information processing apparatus including a display unit provided with an antenna for radiating radio waves, and to an operation control method of the information processing apparatus.

2. Description of the Related Art

Some information processing apparatuses, such as personal computers, are provided with an antenna in a display unit in order to perform wireless communication with other apparatuses. For example, U.S. Pat. No. 6,426,723 discloses a technique of providing a display unit with an antenna in a top portion and a side portion thereof.

In addition, recently, information processing apparatuses called "tablet PCs" are becoming widely used. In the tablet PCs, a display unit including a tablet in a display portion is rotatably attached to a main body via a hinge. Generally, in such an information processing apparatus, a tablet usage pattern called "tablet mode" is realized by folding the information processing apparatus such that a back surface of the display unit contacts a top surface of the main body, and a tablet is exposed to the outside.

Meanwhile, when a tablet PC including an antenna for irradiating radio waves is used, especially when the tablet PC is used in a tablet mode, in some cases, the antenna is located close to a user's body (abdomen, chest, etc.). In such cases, there is a possibility that an information processing apparatus does not satisfy standards established by a Japanese law related to radio waves. In Japan, the Ordinance Regulating Radio Equipment (an ordinance by the Ministry of Internal Affairs and Telecommunications) regulates the upper limit of the specific absorption rate (SAR), which is a physical value representing the level of energy of radio waves absorbed by a human body, and obliges us to observe the ordinance.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an information processing apparatus including: a display unit; a display portion provided in the display unit; and antennas provided in the display unit, the antennas including a first antenna which serves as a transmitting antenna and a second antenna which serves as a receiving antenna; and an antenna switching unit which, when the display unit is used in a state where the first antenna is located in a side of the display unit which side is closest to a user, makes the first antenna serve as a receiving antenna, and makes the second antenna serve as a transmitting antenna.

The invention can be realized in both a tablet input apparatus formed by a single housing in which a display unit serves as a main body, and a computer device such as a tablet PC in which a display unit is rotatably attached to a main body.

Hereinafter, the embodiments of the invention will be described by taking as an example the computer device in which the display unit is rotatably attached to the main body.

Figure 1:
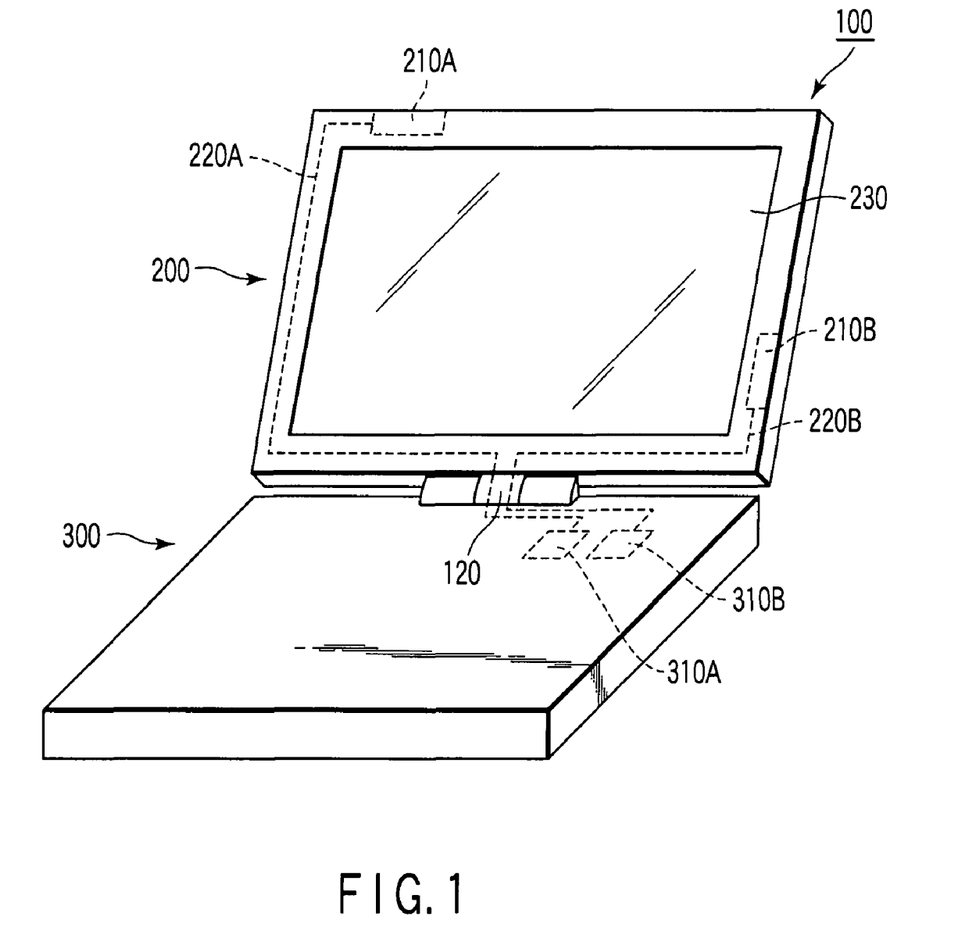
FIG. 1 is an exemplary perspective view showing an external appearance of an information processing apparatus according to first and second embodiments of the invention.

FIG. 1 shows an exemplary external structure of an information processing apparatus according to first and second embodiments of the invention.

The information processing apparatus shown in FIG. 1 is, for example, a personal computer 100 called "tablet PC". The tablet PC 100 includes a structure in which a display unit 200 including a tablet in a liquid crystal panel (display portion) 230 is rotatably attached to a main body 300 via a hinge 120. With such a structure, the display unit 200 can freely rotate on the hinge 120. For example, it is possible to close (fold) the tablet PC 100 such that the display unit 200 contacts the main body 300, and a display surface of the liquid crystal panel 230 is exposed to the outside. FIG. 1 shows a state (corresponding to a usage pattern called "laptop mode" or "normal mode") where the display unit 200 is opened (separated) from the main body 300, such that the display surface of the liquid crystal panel 230 faces inward.

Antennas 210A and 210B for wireless LAN are provided inside two adjacent sides of the display unit 200. These antennas 210A and 210B are provided at right angle with respect to each other, and are capable of receiving different polarized electromagnetic radiations. In the state where the display unit 200 is opened, the antenna 210A is provided in, for example, a top portion of the display unit 200, and the antenna 210B is provided in, for example, a side portion of the display unit 200. Additionally, the antenna 210A may be provided in a back side of the display unit 200, and the antenna 210B may be provided in a front side (the display-surface side of the liquid crystal panel 230) of the display unit 200. Of course, the antenna 210A may be provided in the front side of the display unit 200, and the antenna 210B may be provided in the back side of the display unit 200. One of the antennas 210A and 210B is used as a transmitting and receiving antenna which can perform transmission (i.e., radiate radio waves) and reception, and the other is used as a receiving antenna which performs only reception. Hereinafter, it is assumed that, in an initial state, the antenna 210A is the receiving antenna, and the antenna 210B is the transmitting and receiving antenna which radiates radio waves.

On the other hand, the main body 300 includes wireless LAN controllers 310A and 310B which are connected to the antennas 210A and 210B, respectively. The wireless LAN controllers 310A and 310B serve as wireless modules. In addition, a feed cable 220A extends from the antenna 210A along a left side surface of the display unit 200, passes through the hinge 120, and is connected to the wireless LAN controller 310A. Similarly, a feed cable 220B extends downward from the antenna 210B, passes through the hinge 120, and is connected to the wireless LAN controller 310B. In the initial state, the wireless LAN controller 310A converts (modulates) a reception signal received by the antenna 210A into data which can be processed within the tablet PC 100, and transmits the converted data to a system bus (e.g., PCI bus). The wireless LAN controller 310B converts a reception signal received by the antenna 210B into data which can be processed within the tablet PC 100, and transmits the converted data to the system bus. In addition, the wireless LAN controller 310B generates transmission data based on information received via the system bus, modulates the generated transmission data, and transmits the transmission data via the antenna 210B. For example, the transmission data is generated based on information which is input by operating a tablet surface, and the transmission data is transmitted from the antenna 210B. The antennas 210A and 210B are not permanently connected to the wireless LAN controllers 310A and 310B, respectively. The connection between the antennas 210A and 210B and the wireless LAN controllers 310A and 310B can be switched by antenna switching units (indicated by a reference numeral 314 in FIG. 7) provided within the wireless LAN controllers 310A and 310B. When switching is made by the antenna switching units, the antenna 210A is connected to the wireless LAN controller 310B via the feed cable 220A, and the antenna 210B is connected to the wireless LAN controller 310A via the feed cable 220B. As a result, the receiving antenna 210A serves as the transmitting and receiving antenna which radiates radio waves, and the transmitting and receiving antenna 210B serves as the receiving antenna.

Figure 2A:
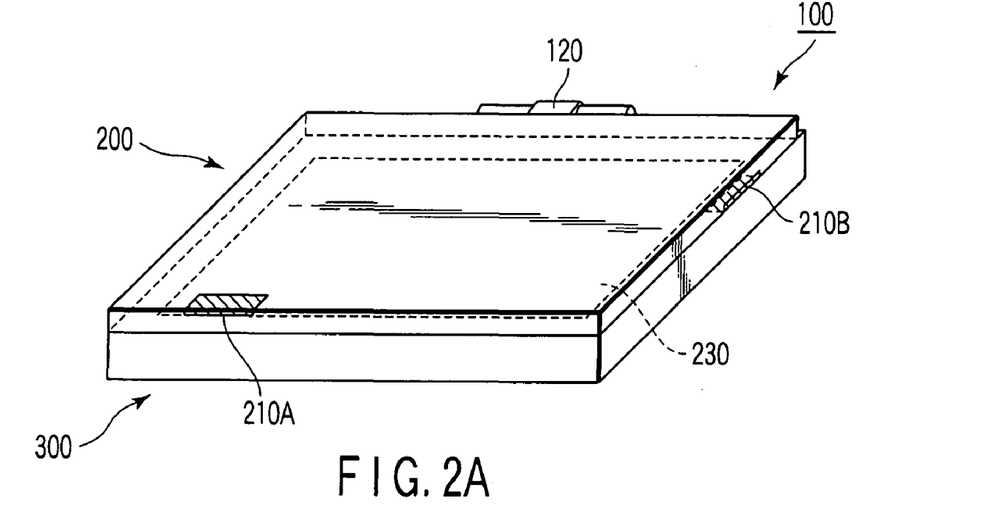
FIG. 2A is an exemplary diagram showing a state where a display unit of the information processing apparatus shown in FIG. 1 is closed to contact a main body with a display panel facing inward.
Figure 2B:
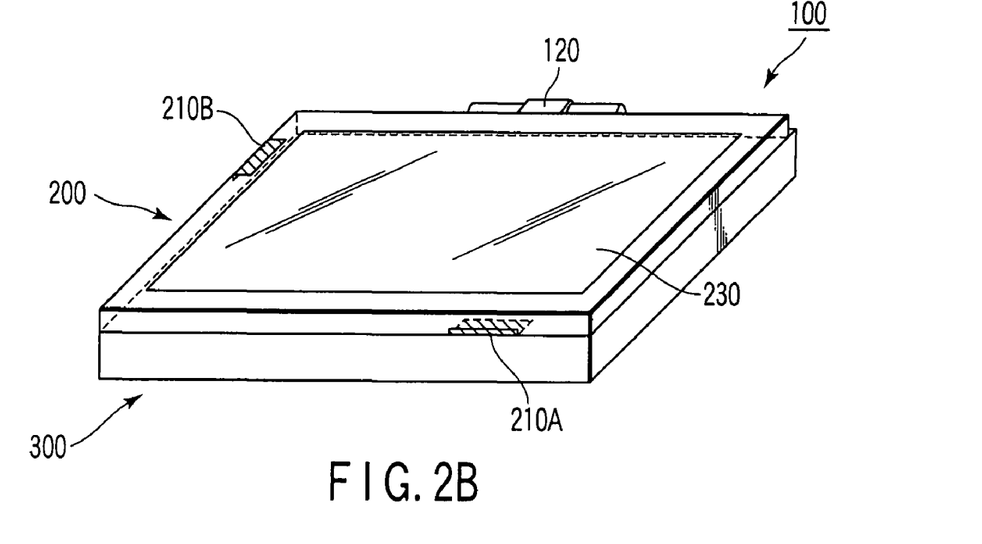
FIG. 2B is an exemplary diagram showing a state where the display unit of the information processing apparatus shown in FIG. 1 is closed to contact the main body with a display panel facing outward.

FIG. 2A shows a state where the tablet PC 100 is closed (folded) such that the display unit 200 contacts the main body 300 with the liquid crystal panel 230 facing inward. On the other hand, FIG. 2B shows a state where the tablet PC 100 is closed (folded) such that the display unit 200 contacts the main body 300 with the liquid crystal panel 230 facing the outside. That is, FIG. 2B shows a state (corresponding to a tablet usage pattern called "tablet mode") where a back surface of the display unit 200 faces a top surface of the main body 300. In FIGS. 2A and 2B, illustration of the feed cables 220A and 220B, the wireless LAN controllers 310A and 310B, etc. is omitted.

Figure 3A:
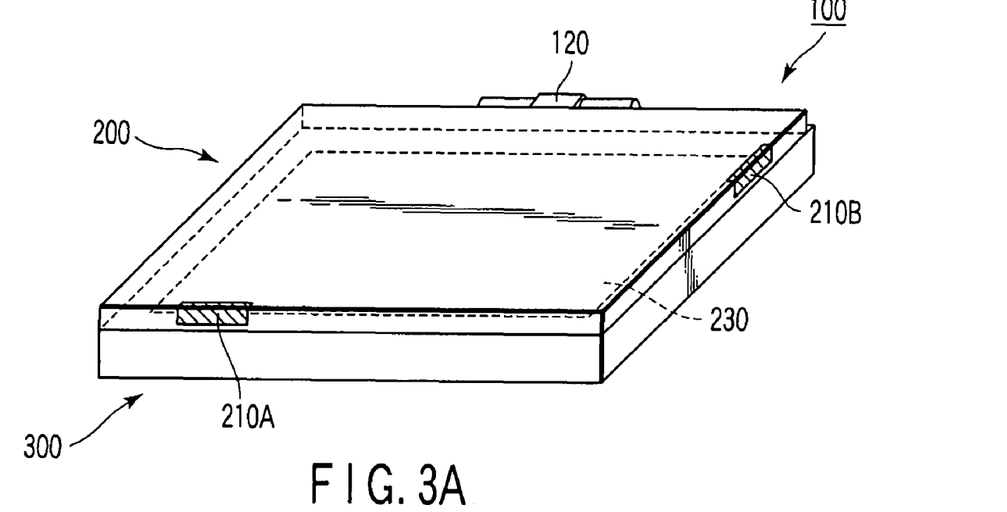
FIG. 3A is an exemplary diagram showing an arrangement of antennas different from an arrangement of the antennas shown in FIG. 1.
Figure 3B:
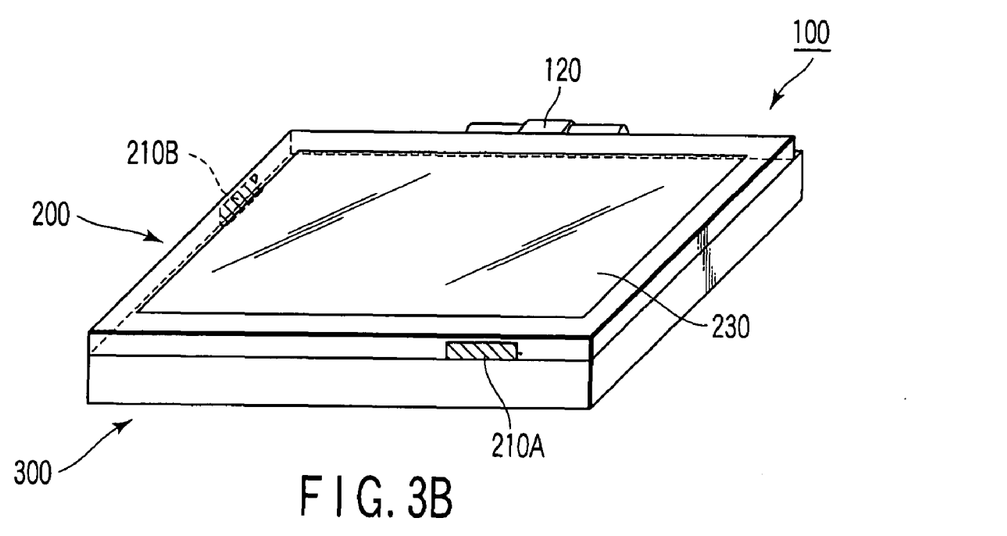
FIG. 3B is an exemplary diagram showing the arrangement of antennas different from the arrangement of the antennas shown in FIG. 1.

The exemplary arrangement of the antennas 210A and 210B shown in FIGS. 2A and 2B may be changed to, for example, an exemplary arrangement shown in FIGS. 3A and 3B. FIGS. 3A and 3B show the exemplary arrangement where each of the antennas 210A and 210B is provided on the back-surface side of the display unit 200.

FIGS. 4A through 4D are exemplary diagrams for explaining usage patterns in the tablet mode. Additionally, FIGS. 5A and 5B are exemplary diagrams for explaining the difference between the usage patterns. The usage patterns are generally classified into "portrait" (vertical display) and "landscape" (horizontal display). In "portrait", the tablet PC 100 is used such that the shorter side of the display unit 200 is close to a user (see FIG. 5A). On the other hand, in "landscape", the tablet PC 100 is used such that the longer side of the display unit 200 is close to the user (see FIG. 5B).

As shown in FIGS. 4A through 4D, the tablet mode may include four kinds of usage patterns: "portrait A" (primary portrait); "portrait B" (secondary portrait); "landscape A" (primary landscape); and "landscape B" (secondary landscape). In FIGS. 4A through 4D, the direction in which the user sees the tablet surface when using the tablet PC 100 is indicated by arrows, and a side of the display unit 200 which side is closest to the user's body (abdomen, chest, etc.) is indicated by X.

Figure 4A:
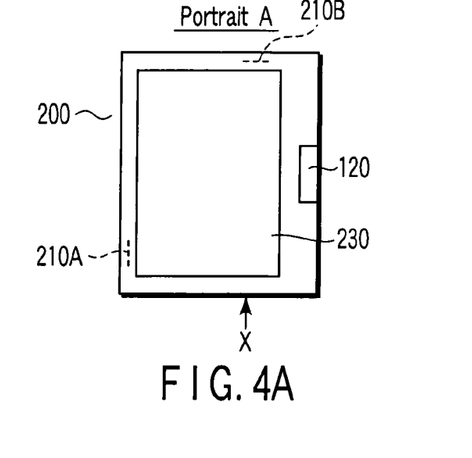
FIG. 4A is an exemplary diagram for explaining a usage pattern in a tablet mode.
Figure 4B:
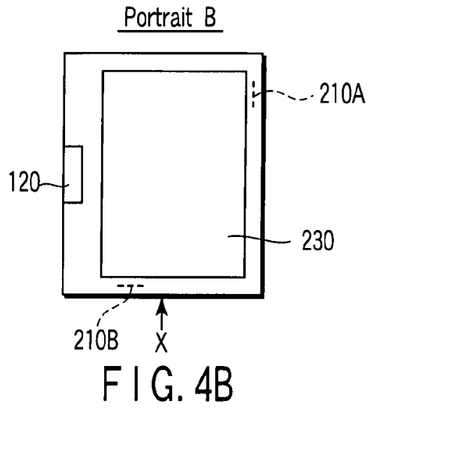
FIG. 4B is an exemplary diagram for explaining another usage pattern in the tablet mode.
Figure 5A:
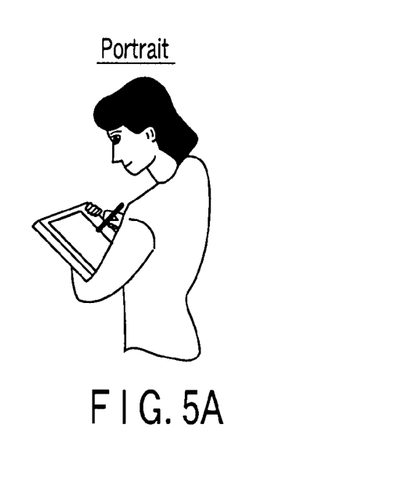
FIG. 5A is an exemplary diagram for explaining an exemplary usage of the information processing apparatus shown in FIG. 1 in the tablet mode.
Figure 5B:
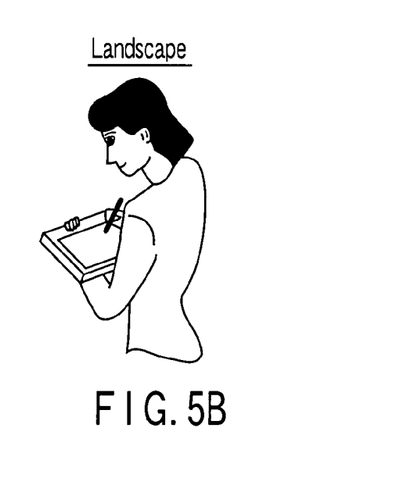
FIG. 5B is an exemplary diagram for explaining another exemplary usage of the information processing apparatus shown in FIG. 1 in the tablet mode.

In the usage pattern "portrait A" shown in FIG. 4A, the hinge 120 is located on the right side of the display unit 200. In the usage pattern "portrait B" shown in FIG. 4B, the hinge 120 is located on the left side of the display unit 200. FIG. 5A shows an exemplary state where the user uses the tablet PC 100 in the usage pattern "portrait A" or "portrait B".

Figure 4C:
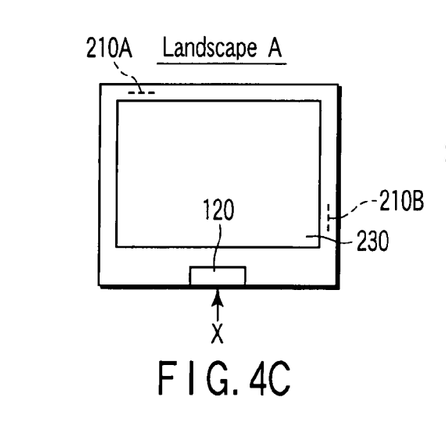
FIG. 4C is an exemplary diagram for explaining still another usage pattern in the tablet mode.

In the usage pattern "landscape A" shown in FIG. 4C, the hinge 120 is located on the lower side of the display unit 200. In the usage pattern "landscape B" shown in FIG. 4D, the hinge 120 is located on the upper side of the display unit 200. FIG. 5B shows an exemplary state where the user uses the tablet PC 100 in the usage pattern "landscape A" or "landscape B".

When the usage pattern is changed from one of the above-mentioned usage patterns to another, the direction of an image displayed on the display portion 230 is also changed. For example, when the user is using the tablet PC 100 in the tablet mode, and changes the usage pattern from "portrait A" shown in FIG. 4A to "landscape A" shown in FIG. 4C, texts/images displayed on the display portion 230 is changed from a state where the texts/images can be appropriately viewed in "portrait A" (i.e., a state where the texts/images can be appropriately viewed with the hinge 120 located on the right side of the display unit 200) to a state where the texts/images can be appropriately viewed in "landscape A" (i.e., a state where the texts/images can be appropriately viewed with the hinge 120 located on the lower side of the display unit 200). In addition, when the user is using the tablet PC 100 in the tablet mode, and changes the usage pattern from "portrait A" shown in FIG. 4A to "portrait B" shown in FIG. 4B, the texts/images displayed on the display portion 230 are changed from a state which allows the texts/images to be appropriately viewed in "portrait A" (i.e., appropriately viewed with the hinge 120 located on the right side of the display unit 200) to a state which allows the texts/images to be appropriately viewed in "portrait B" (i.e., appropriately viewed with the hinge 120 located on the left side of the display unit 200). Further, when the usage pattern is changed from one of the above-mentioned four usage patterns to another, e.g., in the cases where the usage pattern is changed from "landscape A" to "landscape B", where the usage pattern is changed from "landscape B" to "portrait B", where the usage pattern is changed from "portrait B" to "portrait A", etc., the direction of the image displayed on the display portion 230 is also changed accordingly, so that the displayed image can be appropriately viewed.

Figure 4D:
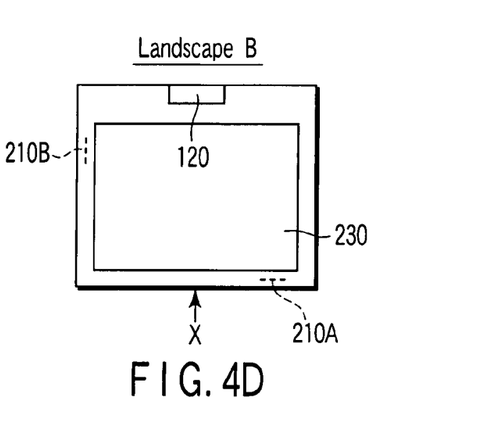
FIG. 4D is an exemplary diagram for explaining still another usage pattern in the tablet mode.

Among the above-mentioned usage patterns, in the usage patterns "portrait A", "landscape A" and "landscape B" shown in FIGS. FIG. 4A, 4C and 4D, respectively, the antenna 210B radiating radio waves is located at a position distant from the user's body. In the usage pattern "portrait B" shown in FIG. 4B, the antenna 210B radiating radio waves is located in a side of the display unit 200 which side is closest to the user's body (e.g., abdomen or chest).

According to the first embodiment of the invention, in the initial state where the antenna 210A serves as the receiving antenna and the antenna 210B serves as the transmitting and receiving antenna, when the usage pattern of the tablet PC 100 in the tablet mode is changed to "portrait B" shown in FIG. 4B, the antenna 210B located in the lower side of the display unit 200 is switched from the transmitting and receiving antenna which radiates radio waves to the receiving antenna, and the antenna 210A located in the right side of the display unit 200 is switched from the receiving antenna to the transmitting and receiving antenna. Further, in the sate where the tablet PC 100 is used in the tablet mode, when the usage pattern of the tablet PC 100 is changed from "portrait B" to another usage pattern, e.g., "landscape B" shown in FIG. 4D, the antenna 210A located in the lower side of the display unit 200 is switched from the transmitting and receiving antenna which radiates radio waves to the receiving antenna, and the antenna 210B located in the left side of the display unit 200 is switched from the receiving antenna to the transmitting and receiving antenna (i.e., the tablet PC 100 returns to the initial state).

By performing switching control of the antennas as mentioned above, it is possible to realize a wireless communication function which conforms to the law related to radio waves by reducing the amount of radio waves to be absorbed by the user (human body) at the time when the user uses the tablet PC 100 in the tablet mode. Additionally, it is possible to realize effective wireless communication by preventing the radiation efficiency of radio waves from being decreased by the human body.

Figure 6:
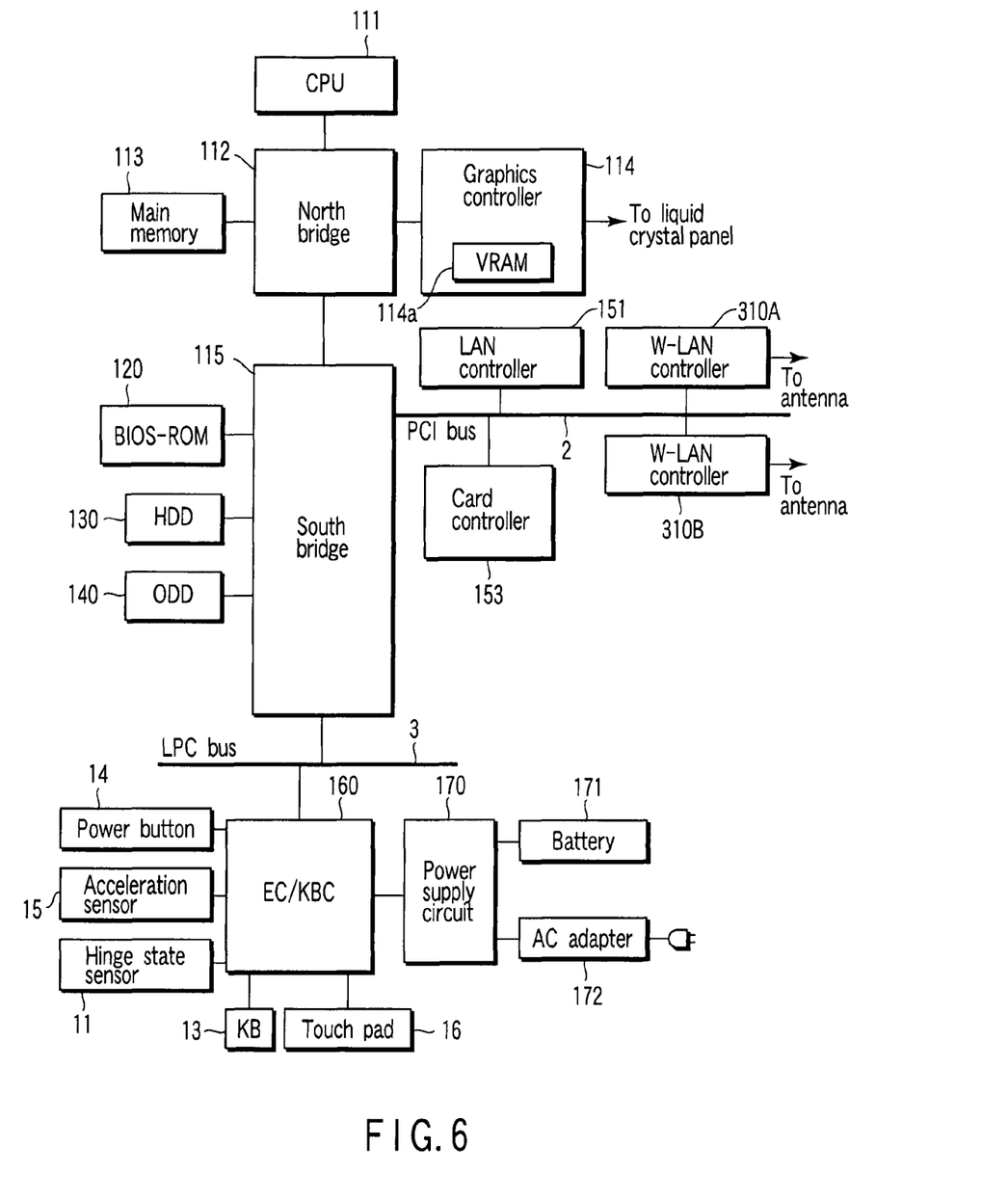
FIG. 6 is an exemplary block diagram showing an exemplary system configuration of the information processing apparatus shown in FIG. 1.

FIG. 6 shows an exemplary system configuration of the tablet PC 100 including an antenna switching control function.

The main body 300 of the tablet PC 100 includes a CPU 111, a north bridge 112, a main memory 113, a graphics controller 114, and a south bridge 115. The main body 300 also includes a BIOS-ROM 120, a hard disk drive (HDD) 130, an optical disk drive (ODD) 140, a LAN controller 151, wireless LAN (W-LAN) controllers 310A and 310B, a card controller 153, an embedded controller/keyboard controller IC (EC/KBC) 160, and a power supply circuit 170.

Figure 10:
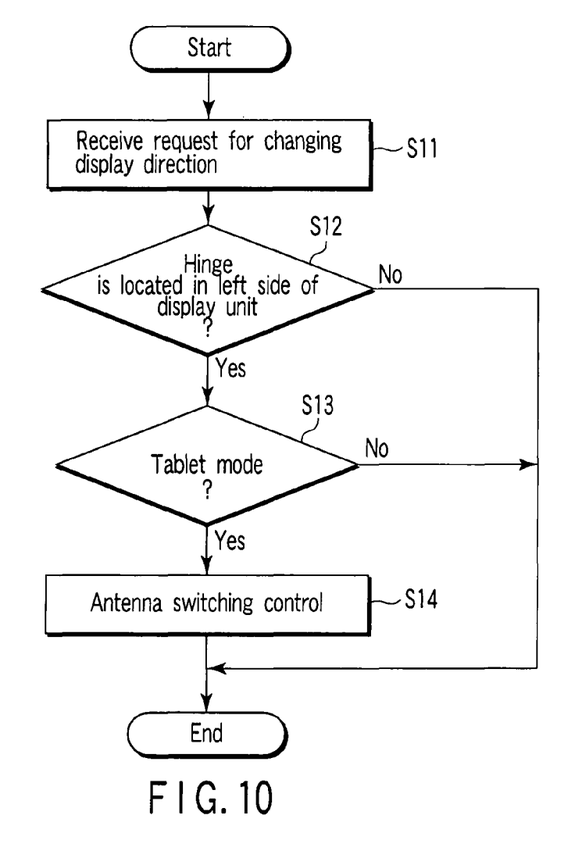
FIG. 10 is an exemplary flowchart for explaining a process according to the first embodiment of the invention.
Figure 11:
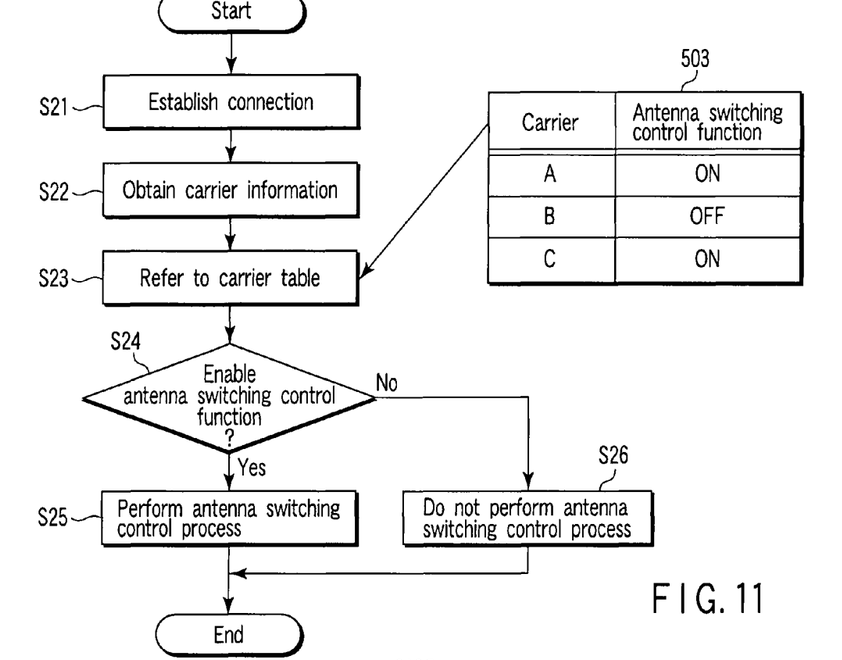
FIG. 11 is an exemplary flowchart for explaining a process according to a second embodiment of the invention.

The CPU 111 is a processor which controls an operation of the computer (tablet PC 100). The CPU 111 executes an operating system (OS) which is loaded from a boot device, such as the HDD 130, to the main memory 113. Additionally, the CPU 111 executes various application programs. Further, the CPU 111 executes a system BIOS (Basic Input Output System) stored in the BIOS-ROM 120. The system BIOS is a program which performs hardware control. FIG. 10 shows an antenna switching control process routine of a utility (program) executed by the CPU 111 according to the first embodiment. FIG. 11 shows an antenna switching control process routine of a utility according to the second embodiment. The antenna switching control process routine of each of the first and second embodiments will be described later.

The north bridge 112 is a bridge device which connects a local bus of the CPU 111 to the south bridge 115. The north bridge 112 incorporates therein a memory controller which controls access to the main memory 113. In addition, the north bridge 112 includes a function of performing communication with the graphics controller 114 via an AGP (Accelerated Graphics Port) bus.

The graphics controller 114 is a display controller which controls, for example, the liquid crystal panel 230. The graphics controller 114 includes a video memory (VRAM) 114a. The graphics controller 114 generates, from display data written in the VRAM 114a, an image signal for forming a display image to be displayed on the liquid crystal panel (display portion) 230.

The south bridge 115 controls access to the BIOS-ROM 120. The BIOS-ROM 120 is a rewritable non-volatile memory such as a flash ROM. As mentioned above, the BIOS-ROM 120 stores the system BIOS. In addition, the south bridge 115 controls disk drives (I/O devices) such as the HDD 130 and the ODD 140. Further, the south bridge 115 is connected to each of a PCI (Peripheral Component Interconnect) bus 2 and an LPC (Low Pin Count) bus 3. The south bridge 115 controls each device on the PCI bus 2 and the LPC bus 3. The PCI bus 2 is used as the system bus.

The HDD 130 is a storage device which stores various kinds of software and data. The HDD 130 writes data in and read data from a magnetic recording medium (magnetic disk) which is rotated by a motor. The operating system (OS) is stored in the HDD 130 in advance. The OS is loaded to the main memory 113 by the system BIOS stored in the BIOS-ROM 120, and is executed by the CPU 111.

The ODD 140 is a drive unit which drives an optical recording medium (optical disk), such as a compact disk (CD) or a digital versatile disk (DVD), by a motor. The ODD 140 reads data from and writes data in the optical disk by using a head (optical head).

The LAN controller 151, the wireless LAN controllers 310A and 310B, and the card controller 153 are connected to the PCI bus 2. The LAN controller 151 is a network controller for connecting the main body 300 to a LAN (wire LAN). The wireless LAN controllers 310A and 310B are network controllers for connecting the main body 300 to a wireless LAN.

The card controller 153 controls a card device, such as a PC card or an SD (Secure Digital) card, which is inserted in a card slot connected to the card controller 153.

The EC/KBC 160 is a single chip microcomputer integrating thereon an embedded controller (EC) 400 for power supply management and a keyboard controller for controlling the keyboard (KB) 13 and a touchpad 16 forming the tablet surface. The EC/KBC 160 includes a power supply control function which powers on the computer (tablet PC) 10 in combination with the power supply circuit 170, in response to a user's operation of a power button switch 14. Additionally, the EC/KBC 160 can receive each detection signal sent from an acceleration sensor 15 and a hinge state sensor 11, and can inform the BIOS, the drivers, or the OS of information indicating various states as information for determining each of the usage modes (tablet mode/laptop mode) and each of the usage patterns shown in FIGS. 4A through 4D.

The accelerated sensor 15 detects acceleration externally gained with respect to three axial directions in a three-dimensional space. The hinge state sensor 11 detects the state of the hinge 120 (i.e., the state of the display unit 200 with respect to the main body 300). The detection signal of each of these sensors is supplied to the BIOS, the drivers or the OS via the EC/KBC 160 as information for determining each of the usage modes (tablet mode/laptop mode) and each of the usage patterns shown in FIGS. 4A through 4D. In this embodiment, each of the usage patterns shown in FIGS. 4A through 4D is determined by the hinge state sensor 11 and the acceleration sensor 15. However, other methods can be used for determination of the usage patterns. For example, it is possible to use a method of providing the display unit 200 with an operation button for giving an instruction to change the usage pattern, and when the operation button is pressed down for a predetermined time period, recognizing the usage pattern based on the detection signal of the acceleration sensor 15. In this method, an operation signal of the operation button triggers the recognition of the usage pattern. Additionally, it is possible to use a method of specifying one of the usage patterns by a selection operation by the user. When any one of these methods is used, it is possible to realize the control function which, when the usage pattern is changed to "portrait B" where the antenna 210B radiating radio waves is located in the lower side of the display unit 200, switches the antenna 210B from the transmitting and receiving antenna which radiates radio waves to the receiving antenna, and switches the antenna 210A located in the right side of the display unit 200 from the receiving antenna to the transmitting and receiving antenna.

The power supply circuit 170 generates a system power supply voltage to be applied to each element of the main body 300 by using a DC current which is supplied via a rechargeable battery 171 or an AC adapter 172 serving as a high voltage power supply. The AC adapter 172 converts AC power to DC power.

Figure 7:
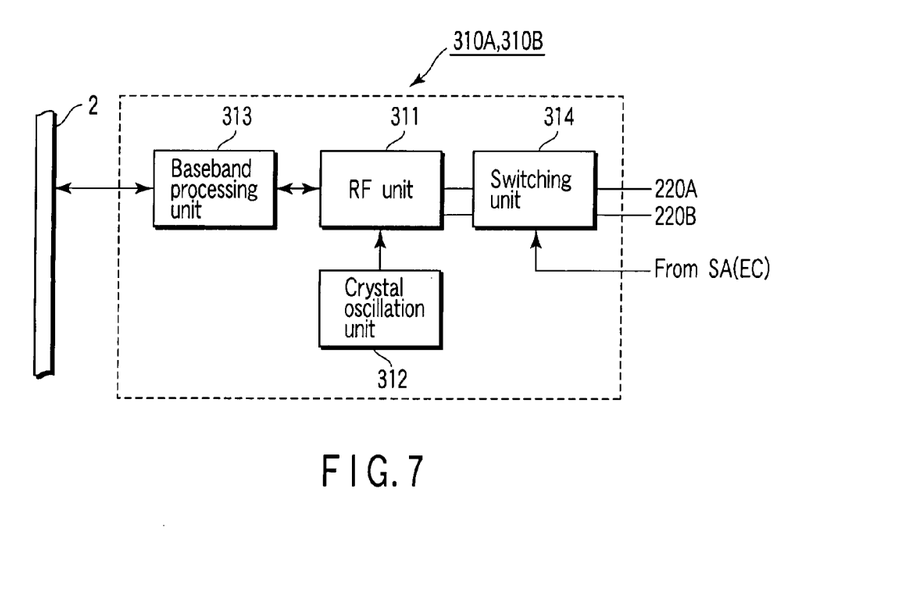
FIG. 7 is an exemplary block diagram showing an exemplary configuration of a wireless LAN controller used in the information processing apparatus shown in FIG. 1.

FIG. 7 shows an exemplary configuration of each of the wireless LAN controllers 310A and 310B which are connected to the antennas 210A and 210B, respectively.

Each of the wireless LAN controllers 310A and 310B includes a RF (Radio Frequency) unit 311, a crystal oscillation unit 312, and a baseband processing unit 313. Each of the wireless LAN controllers 310A and 310B also includes an antenna switching unit 313 which switches an antenna to be used between the antennas 210A and 210B (i.e., between the receiving antenna and the transmitting and receiving antenna).

The RF unit 311 converts a high frequency signal which is input from the antenna 210A (210B) via the feed cable 220A (220B) to a low frequency signal based on an oscillating frequency of the crystal oscillation unit 312, and outputs the low frequency signal to the baseband processing unit 313. In addition, the RF unit 311 converts (modulates) a baseband signal which is output from the baseband processing unit 313 to a high frequency signal based on the oscillation frequency from the crystal oscillation unit 312, and outputs the high frequency signal to the antenna 210A (210B) via the feed cable 220A (220B).

The baseband processing unit 313 performs analog-to-digital conversion on the baseband signal which is output from the RF unit 311, thereby converting the baseband signal to a digital signal which can be processed by the CPU 111. The baseband processing unit 313 outputs the digital signal to the PCI bus 2. Additionally, the baseband processing unit 313 performs digital-to-analog conversion on a digital signal which is input from the PCI bus 2, thereby converting the digital signal to an analog signal in a baseband. The baseband processing unit 313 outputs the analog signal to the RF unit 311.

Figure 8:
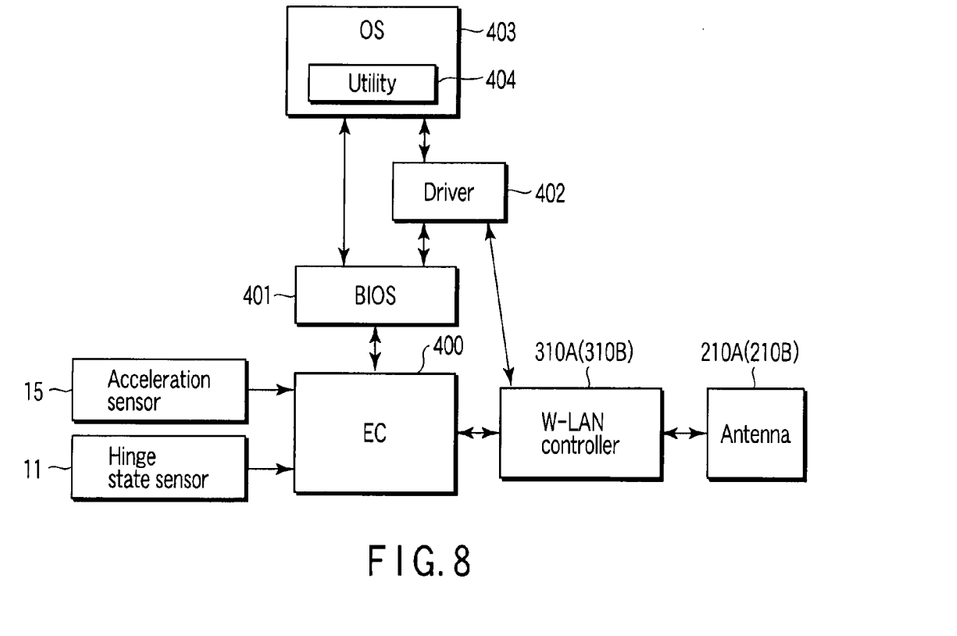
FIG. 8 is an exemplary block diagram showing functional elements of the information processing apparatus shown in FIG. 1.

The antenna switching unit 313 switches the antenna to be used between the antennas 210A and 210B based on a switch control signal (SA) sent from the EC 400 shown in FIG. 8. The switching between the antennas 210A and 210B is performed by mutually performing switching of the antennas 210A and 210B by the wireless modules (wireless LAN controllers 310A, 310B). For example, in the case where the wireless LAN controller 310A is connected to the antenna 210A, and the wireless LAN controller 310B is connected to the antenna 210B, when the antenna switching unit 313 of each of the wireless LAN controllers 310A and 310B receives the switch control signal (SA), switching from the antenna 210A to the antenna 210B by the wireless LAN controller 310A and switching from the antenna 210B to the antenna 210A by the wireless LAN controller 310B are performed at the same time. In this manner, the wireless LAN controllers 310A and 310B simultaneously receive the switch control signal (SA) by their respective antenna switching units 313, and mutually perform switching between the antennas 210A and 210B. In this embodiment, the wireless LAN controllers 310A and 310B are provided on the PCI bus 2 as wireless controllers which are connected to the antennas 210A and 210B, respectively. However, the wireless controllers may be provided on, for example, a general-purpose bus such as a USB bus (not shown) which is connected to the south bridge 115.

FIG. 8 shows functional elements in the system configuration shown in FIG. 6 for realizing an antenna switching control function for switching the antenna 210A to the transmitting and receiving antenna which radiates radio waves, and switching the antenna 210B to the receiving antenna, when the usage pattern is changed to "portrait B" where the antenna 210B irradiating radio waves is located in the side of the display unit 200 which side is closest to the user's body.

As shown in FIG. 8, the EC 400 can transmit, to the OS 403 via the BIOS 401, acceleration information obtained from the acceleration sensor 15 and hinge state information sent from the hinge state sensor 11. It is also possible to adopt a configuration in which the acceleration information and the hinge state information are provided to the OS 403 without using the EC 400.

The BIOS 401 can obtain, for example, the acceleration information and the hinge state information, and inform the OS 403 of these kinds of information. The driver 402 controls the wireless LAN controllers 310A and 310B under control by the OS 403.

OS 403 can recognize each of the usage modes (tablet mode/laptop mode) of the tablet PC 100 and each of the usage patterns in the tablet mode shown in FIGS. 4A through 4D, and can recognize the direction of a current display image based on the information related to display and stored in the OS 403. Additionally, the OS 403 can recognize the usage pattern of the tablet PC 100 based on the obtained acceleration information and hinge state information, and can appropriately switch the direction of an image displayed on the display portion 230 in accordance with the recognized usage mode (i.e., it is possible to switch to any of the four kinds of usage patterns shown in FIGS. 4A through 4D in the tablet mode). Further, the OS 403 can obtain carrier information (e.g., information of carriers to be accessed (carrier information)) via a predetermined communication module (3G module, etc.). Such information is sent to a utility 404 and used for controlling display (the direction of a display image) in accordance with the usage pattern.

Figure 9:
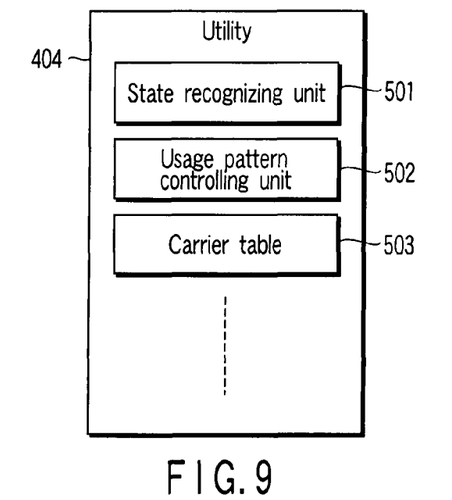
FIG. 9 is an exemplary diagram showing an exemplary function/configuration of a utility used in the information processing apparatus shown in FIG. 1.

As shown in FIG. 9, the utility 404 includes a state recognizing unit 501, a usage pattern controlling unit 502, a carrier table 503 including information of the carriers, etc. It is not always necessary to provide the state recognizing unit 501, the usage pattern controlling unit 502, and the carrier table 503 in the utility 404. A part of the functions of the state recognizing unit 501, the usage pattern controlling unit 502, and the carrier table 503 may be realized by another software or hardware.

The carrier table 503 includes setting information indicating whether to enable or disable the antenna switching control function in accordance with the usage pattern in the tablet mode. The carrier table 503 includes the setting information for each of the carriers which provide wireless environments to be used by the tablet PC 100. A description is given later of a process using the carrier table 503 with reference to FIG. 11.

The state recognizing unit 501 recognizes, for example, each of the usage modes (tablet mode/laptop mode) and each of the usage patterns shown in FIGS. 4A through 4D of the tablet PC 100, based on the information of the direction of a display image obtained from the OS 403, and the acceleration information and the hinge state information which are obtained from the BIOS 401 (or the OS 403). When the tablet PC 100 is used in the tablet mode, the state recognizing unit 501 recognizes each of the usage patterns "portrait A", "portrait B", "landscape A" and "landscape B" shown in FIGS. 4A, 4B, 4C and 4D, respectively.

The usage pattern controlling unit 502 controls the direction of an image displayed on the display portion 230 based on the usage pattern recognized by the state recognizing unit 501. For example, when the user is using the tablet PC 100 in the tablet mode, and changes the usage pattern from "portrait A" shown in FIG. 4A to "landscape A" shown in FIG. 4C, the usage pattern controlling unit 502 switches the direction of a text/image displayed on the display portion 230 from a state where the text/image can be appropriately viewed in "portrait A" (i.e., the text/image can be appropriately viewed with the hinge 120 located in the right side of the display unit 200) to a state where the text/image can be appropriately viewed in "landscape A" (i.e., the text/image can be appropriately viewed with the hinge 120 located in the lower side of the display unit 200). Additionally, when the user is using the tablet PC 100 in the tablet mode, and changes the usage pattern from "portrait A" shown in FIG. 4A to "portrait B" shown in FIG. 4B, the usage pattern controlling unit 502 switches the direction of the text/image displayed on the display portion 230 from a sate where the text/image can be appropriately viewed in "portrait A" (i.e., the text/image can be appropriately viewed with the hinge 120 located in the right side of the display unit 200) to a state where the text/image can be appropriately viewed in "portrait B" (i.e., the text/image can be appropriately viewed with the hinge 120 located in the left side of the display unit 200).

Further, the usage pattern controlling unit 502 includes the antenna switching control function for switching between the transmitting and receiving antenna and the receiving antenna based on the usage pattern recognized by the state recognizing unit 501.

FIG. 10 shows an exemplary procedure of an antenna switching control process in the state recognizing unit 501 and the usage pattern controlling unit 502 which are provided in the utility 404. In this exemplary procedure, as for the order of an antenna switching control process and a switching control process of the direction of an image displayed on the display portion 230, the direction of the display image is switched first in accordance with the direction of the display unit 200, and then the transmitting and receiving antenna radiating radio waves is switched between the antennas 210A and 210B in accordance with the direction of the display image. However, the transmitting and receiving antenna radiating radio waves may be switched first between the antennas 210A and 210B in accordance with the direction of the display unit 200, and then the direction of the display image may be switched in accordance with the switching between the antennas 210A and 210B.

Referring to FIG. 10, a description is given of the antenna switching control process in accordance with the usage patterns according to the first embodiment of the invention. It should be noted that the description is given of the case where the direction of the display unit 200 is changed in the state (initial state) where the antenna 210A is used as the receiving antenna and the antenna 210B is used as the transmitting and receiving antenna. Additionally, it is assumed that the direction of an image displayed on the display portion 230 is switched in accordance with the usage patterns shown in FIGS. 4A through 4D.

Under control by the OS 403, the state recognizing unit 501 recognizes the usage pattern of the tablet PC 100 based on the acceleration information, the hinge state information, and the information of the direction of a display image obtained from the OS 403 (S11 through S13). Here, in the case where a change is detected in the direction of the display unit 200 when the tablet PC 100 is used (or in the case where the user issues a request for changing the display direction by, for example, operating the operation button, and the request is received)(S11), the state recognizing unit 501 determines whether or not the tablet PC 100 is used in the usage pattern where the hinge 120 is located in the left side of the display unit 200 when seen from the user (S12). When it is determined that the tablet PC 100 is used in the usage pattern where the hinge 120 is located in the left side of the display unit 200 (YES in S12), it is determined whether the tablet PC 100 is used in the tablet mode or the laptop mode (S13). Information indicating each of the determination results is provided to the usage pattern controlling unit 502.

Based on the information indicating the determination result received from the state recognizing unit 501, when the usage pattern controlling unit 502 recognizes that the usage pattern of the tablet PC 100 is changed to the usage pattern "portrait B" in the tablet mode (the usage pattern where the antenna 210B radiating radio waves is located in the lower side of the display unit 200 which side is closest to the user's body) (YES in S13), the usage pattern controlling unit 502 switches the antenna 210B located in the lower side of the display unit 200 from the transmitting and receiving antenna to the receiving antenna, and switches the antenna 210A located in the right side of the display unit 200 from the receiving antenna to the transmitting and receiving antenna (S14). Further, after the switching of the antennas 210A and 210B, when the usage pattern of the tablet PC 100 is changed from "portrait B" to another usage pattern, e.g., "landscape B" shown in FIG. 4D, the antenna 210A located in the lower side of the display unit 200 is switched from the transmitting and receiving antenna radiating radio waves, and the antenna 210B located in the left side of the display unit 200 is switched from the receiving antenna to the transmitting and receiving antenna (i.e., the state of the antennas 210A and 210B is returned to the initial state).

The switching control of each of the antennas 210A and 210B is performed as follows: the usage pattern controlling unit 502 provided in the utility 404 issues, to the EC 400, an instruction for outputting the switch control signal (SA); and the EC 400 sends the switch control signal (SA) to the antenna switching unit 313 of each of the wireless LAN controllers 310A and 310B.

In this manner, when the antenna 210B which radiates radio waves is located in the lower side of the display unit 200 which side is closest to the user's body (e.g., abdomen or chest), the switching control is performed on the antennas 210A and 210B such that each of the antennas 210A and 210B is switched between the transmitting and receiving antenna and the receiving antenna.

With the switching control of the antennas 210A and 210B as mentioned above, the amount of radio waves is reduced which are irradiated in transmission and absorbed by the user (human body) at the time when the user uses the tablet PC 100 in the tablet mode. Thus, it is possible to realize a tablet PC including a wireless communication function which conforms to the law related to radio waves. Additionally, it is possible to realize a system including an effective wireless communication function which prevents the radiation efficiency of radio waves from being decreased by the human body.

FIG. 11 shows a display control process procedure in accordance with the usage pattern according to a second embodiment of the invention. The second embodiment further provides a function of enabling/disabling the above-mentioned antenna switching control function in the first embodiment in accordance with a carrier which provides a wireless environment used by the tablet PC 100.

Every time the wireless LAN controller 310B establishes connection with a communication line (not shown) (S21), the usage pattern controlling unit 502 obtains the carrier information (S22). Based on the obtained carrier information, the usage pattern controlling unit 502 refers to the carrier table 503 (S23), and determines whether to enable or disable the antenna switching control function in accordance with the usage pattern (S24). Here, when a carrier to be accessed is, for example, Carrier A which requires the antenna switching control function in accordance with the usage pattern, every time the direction of the display unit 200 is changed, the antenna switching control process shown in FIG. 10 is performed (S25). In addition, when the carrier to be accessed is, for example, Carrier B which does not require the antenna switching control function in accordance with the usage pattern, the antenna switching control process shown in FIG. 10 is not performed (S26).

As mentioned above, since the antenna switching control function in accordance with the usage pattern is provided in the tablet PC 100 which performs wireless communication, it is possible to perform an input/output operation in each of the usage patterns in consideration of an SAR (Specific Absorption Rate), etc.

In each of the above-mentioned embodiments, the description is given of the case where the display unit 200 includes the two antennas 210A and 210B. Next, a description is given of third and fourth embodiments of the invention by taking a case as an example where antennas (Antenna A, Antenna B, and Antenna C) are provided in the display unit 200 such that each of three sides of the display unit 200 includes one of the antennas.

Figure 12:
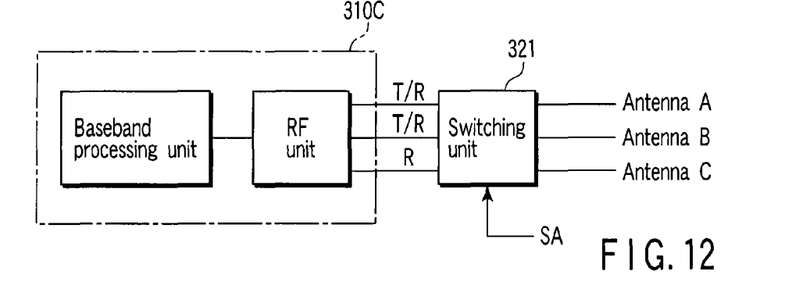
FIG. 12 is an exemplary block diagram showing a partial structure of an information processing apparatus according to a third embodiment of the invention.

FIG. 12 shows a partial structure of an information processing apparatus according to the third embodiment of the invention. In the third embodiment shown in FIG. 12, a wireless module 310C includes two transmitting and receiving antenna connection terminals (T/R) and a receiving antenna connection terminal (R). The wireless module 310C is connected to the three antennas (Antenna A, Antenna B, and Antenna C), which are provided in the display unit 200, via an antenna switching unit 321. In the third embodiment, the antenna switching unit 321 is provided outside the wireless module 310C.

Similar to the antenna switching unit 313 used in the above-mentioned first embodiment, the antenna switching unit 321 performs antenna switching control in accordance with a switching control signal (SA), which is received from the EC 400. The EC 400 outputs the switching control signal (SA) in accordance with an instruction from the usage pattern controlling unit 502, which is provided in the utility 404 shown in FIG. 9.

Here, an antenna using state (initial state) is assumed where, among the three antennas (Antenna A, Antenna B, and Antenna C), Antenna A and Antenna B are transmitting and receiving antennas, and Antenna C is a receiving antenna. In this antenna using state, when the direction of the display unit 200 is changed, the usage pattern in the tablet mode is changed, and one of the transmitting and receiving antennas (e.g., Antenna A), which radiate radio waves, is located in one side of the display unit 200 which side is closest to the user, Antenna A is switched from the transmitting and receiving antenna to the receiving antenna, and Antenna C is switched from the receiving antenna to the transmitting and receiving antenna.

In this manner, when one of the antennas (Antenna A or Antenna B) which radiate radio waves is located in the side of the display unit 200 which side is closest to the user's body (abdomen, chest, etc.), antenna switching control to switch the antennas (Antenna A, Antenna B, and Antenna C) between the transmitting and receiving antenna and the receiving antenna is performed such that one of the antennas closest to the user's body is switched to the receiving antenna.

Figure 13:
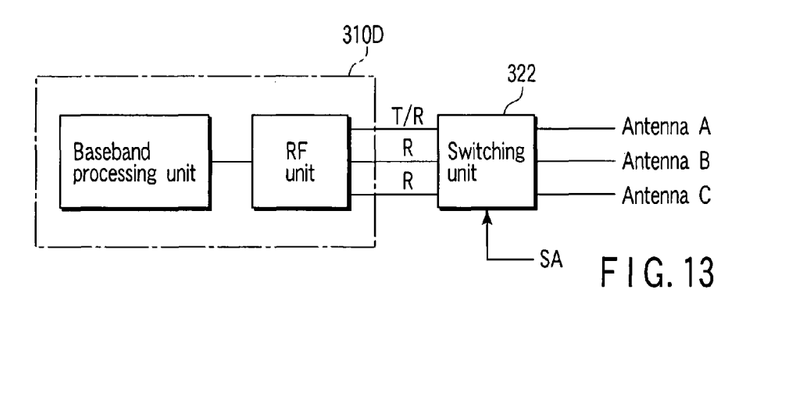
FIG. 13 is an exemplary block diagram showing a partial structure of an information processing apparatus according to a fourth embodiment of the invention.

FIG. 13 shows a partial structure of an information processing apparatus according to the fourth embodiment of the invention. In the fourth embodiment shown in FIG. 4, a wireless LAN module 310D includes a transmitting and receiving antenna connection terminal (T/R) and two receiving antenna connection terminals (R). The wireless LAN module 310D is connected to the three antennas (Antenna A, Antenna B, and Antenna C), which are provided in the display unit 200, via an antenna switching unit 322.

In the fourth embodiment, as in the above-mentioned third embodiment, when one of the antennas (e.g., Antenna B) which radiates radio waves is located in one side of the display unit 200 which side is closest to the user's body (abdomen, chest, etc.), antenna switching control to switch the antennas (Antenna A, Antenna B, and Antenna C) between the transmitting and receiving antenna and the receiving antenna is performed such that Antenna B which is closest to the user's body is switched to the receiving antenna. It should be noted that operations, a switching control signal (SA)

generation process, etc. of the wireless LAN modules 310C and 310D in the third and fourth embodiment, respectively, are easily appreciated from the above-mentioned first embodiment, and thus a description thereof is omitted.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. For example, in each of the above-mentioned embodiments, the function of the invention is realized in the tablet PC 100 in which the display unit 200 is rotatably attached to the main body 300. However, the invention may be realized in other devices. For example, the invention can also be realized in a tablet input device having a single housing. In addition, the four kinds of usage patterns are described as the usage patterns in the tablet mode. However, the usage patterns in the tablet mode are not limited to the above-mentioned four kinds of usage patterns. The invention may be applied to an apparatus which allows at least two or more kinds of usage patterns. Further, the unit for determining the usage mode and the usage pattern is not limited to the above-mentioned state recognizing unit 501. It is also possible to use another detecting mechanism, or a method of specifying the usage pattern by a user's operation and another determination method. The configuration of the wireless modules is not limited to the configuration described in the above-mentioned embodiments. The wireless modules may be wireless modules including a communication function other than the wireless LAN communication function. In short, in an apparatus which includes an antenna radiating radio waves and can be used in a state where the antenna is located close to a human body, the apparatus should be configured to realize, without condition or under a specific condition, the antenna switching control function of switching the antennas between the transmitting and receiving antenna and the receiving antenna such that the antenna closest to the user's body (abdomen, chest, etc.) is switched to the receiving antenna. The accompanying claims and their equivalents are intended to cover such forms or modifications as would fall within the scope and spirit of the inventions.

What is claimed is:

1. An information processing apparatus, comprising:
    a display unit;
    a display portion provided in the display unit; and
    antennas provided in the display unit, the antennas including a first antenna which serves as a transmitting antenna and a second antenna which serves as a receiving antenna; and
    an antenna switching unit which, when the display unit is used in a state where the first antenna is located in a side of the display unit which side is closest to a user, makes the first antenna serve as a receiving antenna, and makes the second antenna serve as a transmitting antenna.

2. The information processing apparatus according to claim 1, wherein the antennas are provided in different sides of the display unit, and at least one of the antennas serves as the transmitting antenna.

3. The information processing apparatus according to claim 2, further comprising:
    a display controlling unit which controls, in accordance with a direction of the display unit, a direction of an image to be displayed on the display portion.

4. The information processing apparatus according to claim 3, further comprising:
    an acceleration sensor which detects an acceleration of the display unit and outputs a detection signal,
    wherein the antenna switching unit makes the antennas serve as one of the transmitting antenna and the receiving antenna based on the detection signal.

5. The information processing apparatus according to claim 4, wherein the display controlling unit controls, based on the detection signal, the direction of the image to be displayed on the display portion.

6. The information processing apparatus according to claim 1, wherein the display unit includes a tablet surface in the display portion.

7. The information processing apparatus according to claim 6, further comprising:
    an acceleration sensor configured to detect an acceleration of the display unit and outputs a detection signal,
    wherein the antenna switching unit makes the antennas serve as one of the transmitting antenna and the receiving antenna based on the detection signal.

8. The information processing apparatus according to claim 6, wherein the antenna switching unit selectively makes the antennas serve as one of the transmitting antenna and the receiving antenna in accordance with information of a carrier to be accessed via the antennas.

9. The information processing apparatus according to claim 6, wherein the antenna switching unit is provided between the antennas and wireless modules using the antennas, and switches the wireless modules to be connected to the antennas.

10. An information processing apparatus, comprising:
    a display unit;
    a display portion provided in the display unit; and
    antennas provided in the display unit, the antennas including a first antenna which serves as a transmitting antenna and a second antenna which serves as a receiving antenna;
    a display controlling unit which controls a direction of an image to be displayed on the display portion in accordance with a direction of the display unit; and
    an antenna switching unit which makes the first antenna serve as a receiving antenna, and makes the second antenna serve as a receiving antenna in accordance with controlling of the direction of the image by the display controlling unit.

11. The information processing apparatus according to claim 10, wherein the antennas are provided in different sides of the display unit, and at least one of the antennas serves as the transmitting antenna.

12. The information processing apparatus according to claim 11, further comprising:
    wireless modules connected to the antennas,
    wherein the display unit includes a tablet surface in the display portion.

13. The information processing apparatus according to claim 12, further comprising:
    an acceleration sensor which detects an acceleration of the display unit and outputs a detection signal,
    wherein the display controlling unit controls, based on the detection signal, the direction of the image to be displayed on the display portion.

14. The information processing apparatus according to claim 11, wherein the antenna switching unit selectively makes the antennas serve as one of the transmitting antenna and the receiving antenna in accordance with information of a carrier to be accessed via the antennas.

15. An operation control method of an apparatus including a display unit provided with a display portion and antennas, the antennas including a first antenna which serves as a transmitting antenna and a second antenna which serves as a receiving antenna, the operation control method comprising:
  switching a direction of an image to be displayed on the display portion in accordance with a direction of the display unit; and
  making the antennas serve as one of the transmitting antenna and the receiving antenna in accordance with the switching of the direction of the image.

16. The operation control method according to claim 15, wherein the switching the direction of the image comprises:
  providing, in the display unit, a sensor which detects an acceleration of the display unit and outputs a detection signal; and
  switching the direction of the image based on the detection signal.

* * * * *